Sept. 21, 1943.  D. H. GASTON  2,330,044
STORAGE PAN FOR REFRIGERATORS
Filed March 7, 1940  2 Sheets-Sheet 1
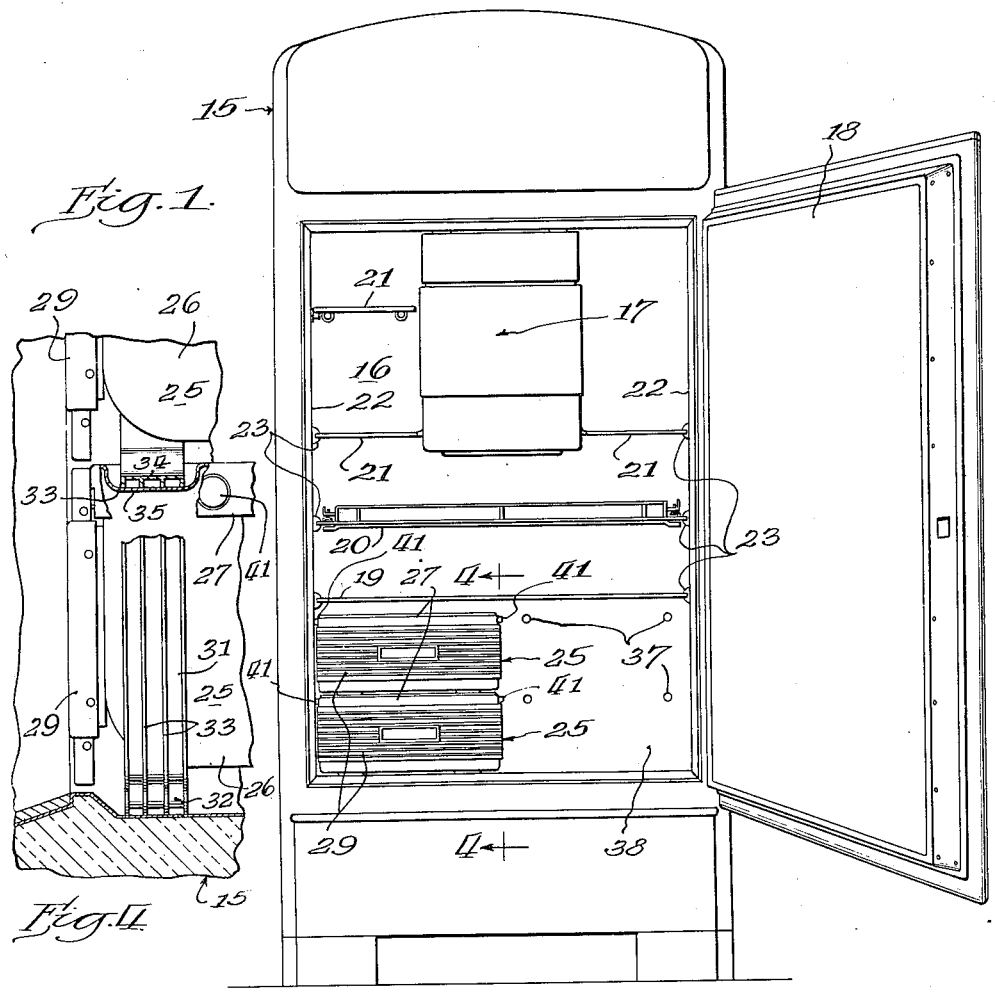
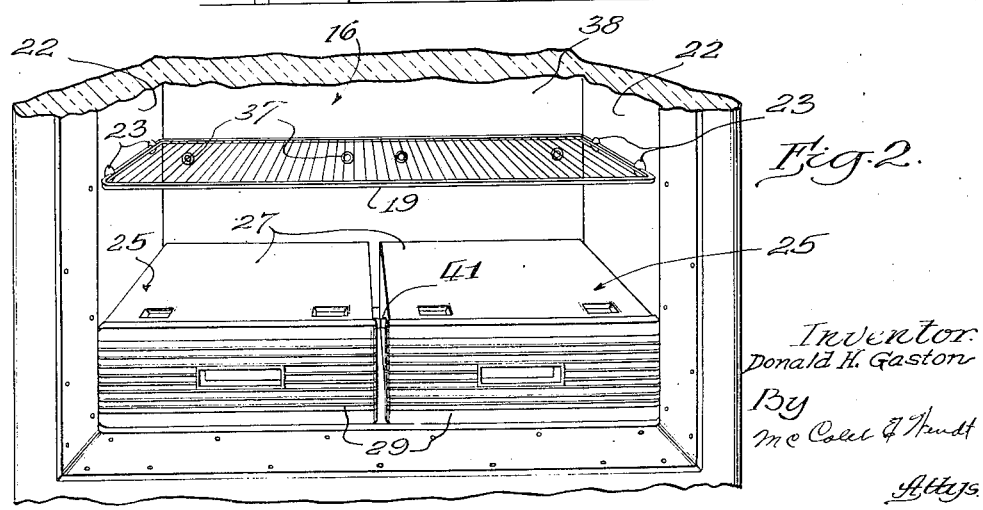

Sept. 21, 1943.　　　D. H. GASTON　　　2,330,044
STORAGE PAN FOR REFRIGERATORS
Filed March 7, 1940　　　2 Sheets-Sheet 2
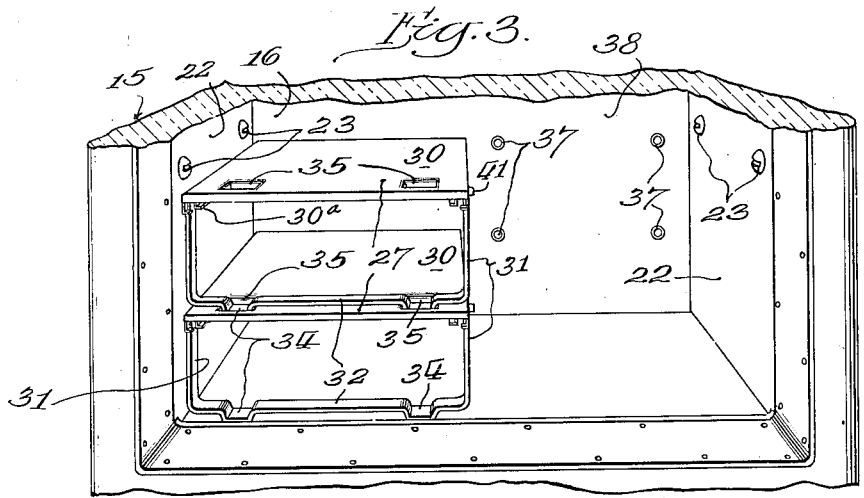
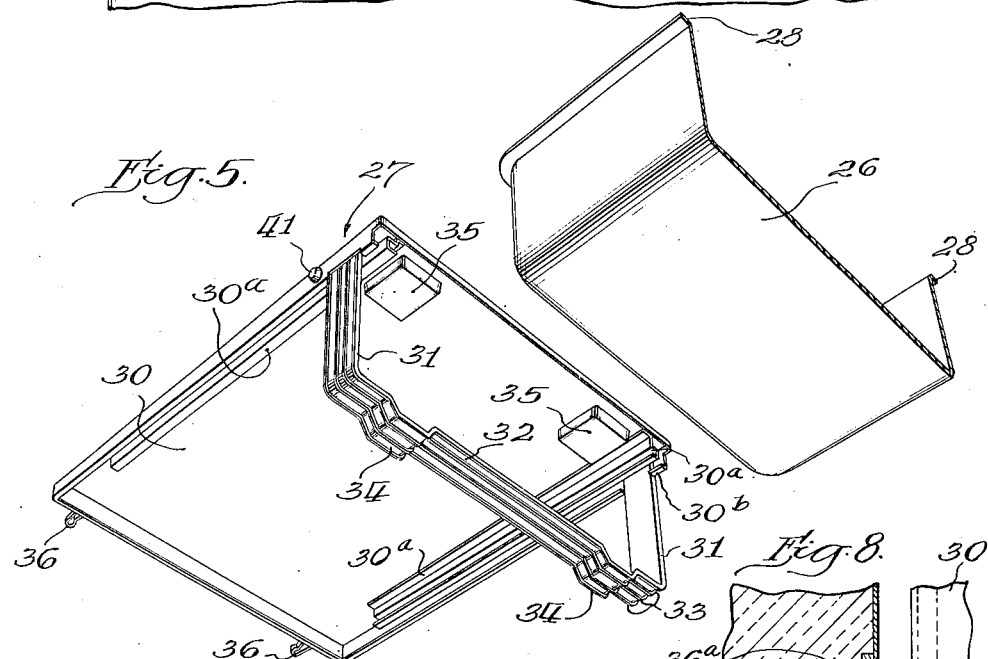
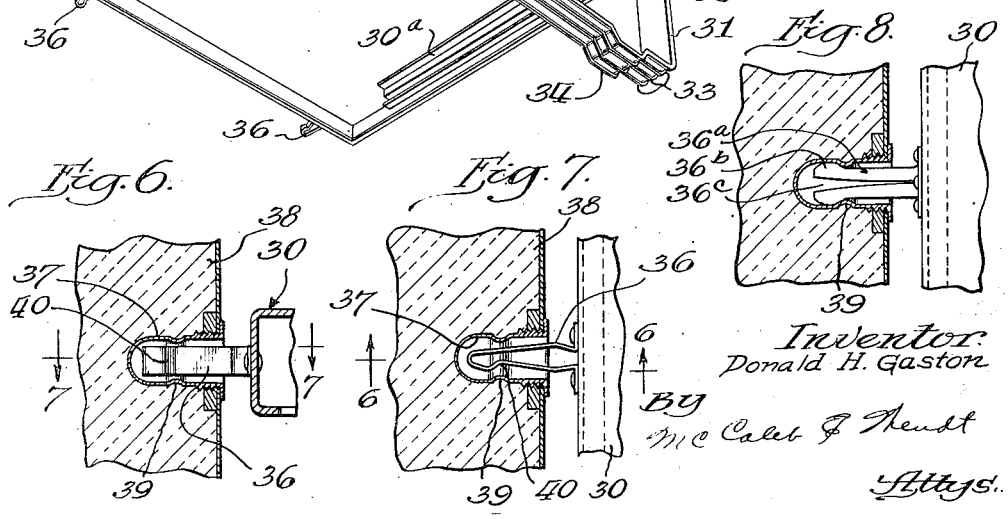

Patented Sept. 21, 1943

2,330,044

UNITED STATES PATENT OFFICE 2,330,044

STORAGE PAN FOR REFRIGERATORS

Donald H. Gaston, Evansville, Ind., assignor to Sunbeam Electric Manufacturing Company, Evansville, Ind., a corporation of Indiana Application March 7, 1940, Serial No. 322,648

10 Claims. (Cl. 312—150)

This invention relates to storage pans for refrigerators. It is concerned especially with pans for storing and crisping vegetables and storing meats or other foods, although many of its features are applicable to open wire type pans for storing citrus fruits, apples, eggs, etc. It is particularly, although not necessarily, applicable to mounting storage pans of the covered drawer type, where the pans can be slid out without removing their covers and supports from the food compartment.

The chief object of the invention is to provide a support or mounting for the pans which affords flexibility in the arrangement of the pans within the refrigerator, and especially where the pans are supported independently of the refrigerator shelves so that the position of the pans is not dependent upon the limitations of the placement of the shelves.

This flexibility of pan composition and arrangement permits changes in the shape of space available for different types of articles or receptacles to be stored within the refrigerator. For example, in storing tall receptacles, greater height in relation to supporting surface is desirable; in storing a number of plates of salad for chilling, for example, a large supporting area, rather than height, is of advantage. By the invention the storage pans may be arranged in various ways to facilitate the changing needs in this respect.

Another object of the invention is an arrangement of vegetable pans which is adaptable to the occasional circumstance that the position in which the refrigerator is placed precludes sufficient free opening of the door to expose the full doorway, which has often interfered with the removal of one or more of the vegetable pans as heretofore mounted.

Another object of the invention is a convenient and inexpensive mounting for the drop type pans, which, although readily removable or re-arrangeable, adequately anchors the mountings against being pulled forwardly with the drawer pans.

The foregoing, together with further objects, features and advantages of this invention, are set forth in the following description of specific embodiments thereof, and are illustrated in the accompanying drawings, wherein Fig. 1 is a front view of a so-called mechanical refrigerator, with the door swung open to reveal the shelf and storage pan arrangement embodying the invention;

Fig. 2 is a perspective view of the lower part of the interior of the food compartment of the refrigerator, showing the storage pans in another arrangement;

Fig. 3 is a perspective view similar to Fig. 2, but showing the pan mountings in the arrangement of Fig. 1, and with the pans removed (the lower refrigerator shelf being omitted so as not to obscure the view);

Fig. 4 is a vertical section through the forward portions of the pans and their mountings, taken on the lines 4—4 of Fig. 1;

Fig. 5 is a perspective view of one of the cover and mounting units, looking at it from beneath, and with a drawer aligned with but removed from the support;

Fig. 6 is a vertical section through a fragment of the back wall of the food compartment, showing the support therein for the rear of the pan cover, which may be considered as taken on the line 6—6 of Fig. 7;

Fig. 7 is a plan section of the same parts, taken on the line 7—7 of Fig. 6; and Fig. 8 is a view similar to Fig. 7, but showing a modification.

In Fig. 1 there is shown a refrigerator 15, having a food compartment 16, a cooling unit 17 mounted centrally at the upper end of the food compartment, and a full door 18 for the food compartment, hinged at the right edge.

A plurality of usual shelves are mounted within the food compartment. As here shown, the lower shelf 19 and the intermediate shelf 20 are full width and full depth shelves, that is, they are substantially horizontally coextensive with the food compartment 16. Narrow shelves 21 extend between the cooling unit 17 and the adjacent lateral walls 22 of the compartment. These shelves are preferably open shelves, of wire or perforated metal, whereby they do not interfere excessively with the free circulation of air to and from the cooling unit. The shelves are mounted in horizontally slotted buttons 23 on the side walls 22 so that the shelves can be slid out for temporary removal.

Figs. 1 and 2 show a pair of storage units, each generally indicated as 25, disposed below the lower shelf 19. In Fig. 2 they are arranged side by side at the bottom of the food compartment, while in Fig. 1 they are shown re-arranged in stacked position at the lower left side of the food compartment, but both beneath the lower shelf 19. It will be understood that in an alternative position they would be at the right side; or, in still another alternative arrangement, one unit 25 could be wholly eliminated, and the other be at the bottom of the food compartment, either on the right side or the left side.

Each storage unit 25 comprises a pan 26 and a combined cover and support 27, as best shown in Fig. 5.

If the pan is used for vegetables or meats, requiring high humidity storage, the pan is preferably drawn from imperforate sheet metal. If it is to be used for apples, oranges, eggs, etc., it may be formed from perforate metal or from wire. Each pan has an outwardly directed horizontal flange 28 running along the upper edges of its side walls, or at least along the upper edges of its lateral wall. A separate rectangular false front 29 is preferably carried at the front end of each pan 26.

Referring to Fig. 5, the combined pan, cover and support 26 comprises a cover 30 and forward legs 31. The cover 30 is preferably formed from an imperforate sheet of metal downwardly flanged at its lateral and rear margins to reinforce and dress it. On its under side and adjacent its respective lateral edges it carries a pair of slide strips 30a, which may conveniently be spot-welded by an upper horizontal flange to the under side of the top sheet. The legs 31 are preferably combined as an integral strip with a bottom reach 32, thereby constituting a U-shaped strip 31, 32, the ends of the legs of which are fixed to the cover 30 at its lateral edges a short distance back from its front edge.

The U-shaped member 31, 32 may be formed by transverse bends in an originally straight strip, having longitudinal beads 33 to ornament and strengthen it. If it be an extruded strip, the beads may be formed in the extruding; if it be a sheet metal strip, the beads may be rolled into it.

Feet 34 are formed by longitudinally short, downward offsets in the bottom reach 32 of the strip, near the respective lateral ends thereof.

The cover sheet 30 contains a pair of depressions 35 stamped therein. The depressions 35 are directly over the feet 34 and of a size just large enough to accommodate the feet 34 of the superposed unit 25 when two units are stacked, as indicated in Fig. 3. As shown in Fig. 3, when one combined support and cover 27, such as illustrated in Fig. 5, is mounted in the food compartment, the cover is disposed in a horizontal plane and the front end is supported by the feet 34 resting upon the floor of the food compartment. When a second unit is to be stacked therein, as shown in Fig. 3, the front of the second or upper top is supported by the feet 34 carried by its U-shaped supporting strip, the feet being received in the depressions 34 in the top of the lower cover. This holds the second unit—especially its front end—in both lateral and longitudinal alignment with the underlying unit. How the rear of the covers are supported will now be explained.

The rearward, down-turned flange of each cover 30 carries a pair of rearwardly extending studs 36 (see Fig. 5) intermediate, but near, its respective lateral edges. These studs 36 are received in appropriately positioned sockets 37 set into the back wall 38 of the food compartment.

There are four pairs of sockets 37 in the back wall 38. The pairs are spaced apart by a distance corresponding to the spacing of the pair of studs 36 carried at the back of each cover. A first pair of sockets 37 is positioned to receive the studs of the cover of a lower unit 25 when positioned at the left side; a second pair of sockets is positioned for the studs of a unit when positioned at the lower right; a third pair is positioned for receiving the studs of a unit 25 when stacked upon a lower unit at the left side; and a fourth pair of sockets is for the upper position at the right side.

The pan is received drawer-like in the combined cover and support, being slidably suspended from the cover by the lateral flanges 28 of the pan sliding on the top of the lower inturned lateral flange 30b of the sliding strip 30a. The cover is not positioned sufficiently close to the pan to seal the interior of the pan, but instead it restricts without entirely precluding air circulation to the pan.

Although the pan slides rather freely in its guide strip suspension on the cover, there is, of course, a certain amount of friction tending to pull the cover and support forwardly when the pan is pulled out—especially a loaded pan. It, therefore, becomes necessary to hold the cover and support against moving forwardly with the cover against such friction as is likely to be developed. From the following explanation it will be readily apparent how the covers and supports are anchored against forward movement, but still arranged for ready forward removal when the cover and support are to be taken out or shifted to another position.

If there is sufficient of a rearwardly facing shoulder where the threshold of the door joins the bottom of the compartment, and if the feet 34 are arranged to lie sufficiently close to that shoulder, thereby to prevent forward sliding movement of the support and cover greater than the length of the studs 36, then the detent feature of the studs and their sockets may be dispensed with.

The contact of the feet against the threshold shoulder would hold a lower support and cover against forward movement. That would, in turn, hold an upper support and cover against forward movement by virtue of the feet of the upper support setting into the sockets 35. Removal of the upper support and cover would then be effected by first slightly raising the front end to clear the feet from the depressions, and then pulling forwardly. A lower support and cover would be removed by lifting the front end sufficiently to clear the shoulder of the threshold, and then pulling forwardly.

However, it is preferable not to rely wholly upon the contact of the feet with the shoulder of the threshold to preclude forward movement of the support and cover in withdrawing the pan. Instead, as shown in Figs. 6 and 7, the tubular sockets 37 are provided with an intermediate bead 39. The studs 36 are formed of narrow, flat strips of resilient metal bent into a modified hairpin loop, with the ends fixed to the downturned rear flange of the cover 30. The looped end is bent around to form a head, providing a hook-like neck 40 at one lateral edge. The pair of studs 36 carried by each cover are arranged so that the hook portions 40 face toward each other. When the studs are inserted, they yield away from each other slightly to permit the heads to pass the beads 39. The construction is such that it requires more forward pull to snap the heads past the beads 39 than the probable frictional drag between a loaded pan and its slide mounting in the cover.

However, by exerting a still stronger pull, the studs may be removed from their sockets when it is desired to remove the cover and its support from one position and put it in another position.

In Fig. 8 there is shown a modification where the stud 36a has a head 36b with a diametrical slot 36c extending through the head and some of the stud, whereby the two halves of the head may be sprung together to enable the head to pass the head 39.

On each of the down-turned lateral flanges of the cover a laterally protruding rubber bumper 41 is mounted. The bumpers are near the front. When one lateral side of a unit 25 comes along one of the lateral walls 22 of the food compartment, the adjacent bumper keeps the unit from coming into direct contact with the wall. This avoids the danger of chipping or scratching the finish on the wall, and also prevents vibration of the refrigerator mechanism from setting up a rattle of the unit against the wall. Where two units are placed side by side, as in Fig. 2, the bumpers on their adjacent sides come into register. This keeps the units out of direct metallic contact with each other.

The side-by-side arrangement of two units at the bottom, as shown in Fig. 2, is, in general, the preferred arrangement because it interferes least with the circulation of air past articles stored in the food compartment, but not in the pans, and tends to minimize the circulation of air into the pans. The coplanar covers 30 in the arrangement of Fig. 2 give a large, continuous area as large as that of the shelves 19 and 20, for example, for the placement of foods and containers which do not have much height.

When the high but narrow space above the right-hand shelf 21 does not afford sufficient width or capacity for the storage of relatively high articles, such as watermelons, turkeys, gallon jugs, milk bottles, etc., then the units 25 may be re-arranged to a stacked position on the left side, as shown in Fig. 1, or, alternatively, on the right side. This affords a space the full depth of the food compartment, half the width thereof, and of height up to the lower shelf 19. If unusually high articles must be stored, the shelf 19 may be removed temporarily, increasing the height of the available space to that of the intermediate shelf 20. Articles may then be set on the cover of the upper unit 25 and may extend any height up to the intermediate shelf 20. Extremely high articles may require the removal of both shelves 19 and 20.

The quantity, size, and nature of things to be stored in the refrigerator may sometimes require such capacity that one or both units 25 have to be removed. When this is necessary, their removal is easily effected, and it is not even necessary to withdraw the pans from their covers and supports, but an entire unit 25 may be removed as a unit.

The flexibility of pan arrangement provided by this invention also makes it possible to mount a third or fourth unit 25 in the refrigerator. By providing additional horizontal rows of sockets 37 in the back wall, a still larger number of units may be accommodated, or three or four units may be mounted, all on the same side.

Sometimes a refrigerator is mounted in a recess or in the corner of a room, with a wall so close to the side wall of the refrigerator at the door hinge side that the door cannot swing back far enough fully to clear the forward projection of the doorway. This would preclude, or at least render very difficult, the removal of the adjacent pan if the two pans were confined to the side-by-side arrangement of Fig. 2. By this invention, however, in case such a limitation on the swinging of the door does exist, the pans may conveniently be stacked in the arrangement of Fig. 1.

It is of particular advantage that while the covers of the pans may themselves be available as supporting surfaces upon which to set articles, the units 25 are quite independent of any of the refrigerator shelves. Thus the units may be arranged in any of the desired positions illustrated, without even temporarily disturbing any of the refrigerator shelves or any of the things which are resting on the shelves. Also, if one or both of the shelves are removed to accommodate articles of unusual height, that may be done without affecting any desired arrangement of the units 25, since the units are quite independent of the shelves.

The extreme skeletonizing of the drawer-like support for the pans not only makes for economy and simplicity in manufacture and lightness in weight, but leaves a very desirable openness and accessibility for cleaning, even without removing the covers and supports, and a high degree of visibility for noting any spilled liquids or small fruits, leaves, slices, or the like, which would not be true if the supports were boxed in; yet when the pans and their drawer fronts are pushed back to their normal position, the drawer fronts and the tops are practically all that is readily visible, and they present the same trimness of appearance that box-like, individual drawer cabinets would present.

In a sense, the U-shaped strips 31, 32, together with the forward margin of the cover, constitute a rectangular framing ring for forwardly supporting the cover from which the pan is slidably suspended. The feet reduce to almost two points forward support of the underlying unit upon the floor, thereby minimizing the tendency to rock and set up a rattle. The cooperating studs and sockets not only support the rear of the covers and prevent inadvertent forward movement of the covers and supports, but they also steady the cover and support, and hold them against lateral shifting or lateral swinging of the front ends.

While I have thus described and illustrated these specific embodiments of my invention, I contemplate that many changes and substitutions may be made without departing from the scope or spirit of my invention.

I claim:

1. In a refrigerator having a bottom and a back wall, the combination of sockets formed in the back wall of the refrigerator and arranged in pairs, the sockets of each pair being horizontally spaced and there being one pair of sockets in horizontal alignment with a second pair of sockets and a third pair of sockets in vertical alignment with the first pair of sockets, a pair of refrigerator pan units in the refrigerator, each unit comprising a horizontal cover, a pan slidably supported by its upper end, ways formed beneath the cover at its lateral edges whereby to support the pan for drawer-like forward sliding from beneath the cover, and leg means depending from the cover near its forward end to a level beneath the bottom of the pan for forwardly supporting the cover, and a pair of rearwardly protruding studs carried by the rear end of the cover and spaced apart a distance agreeing with the spacing of the sockets of each pair, one of the pan units being positioned in a lower lateral corner of the refrigerator with its leg means resting on the floor and its pair of studs releasably secured in the first pair of sockets and the second unit being positioned at the side of the first unit with its studs entering the second pair of sockets and its leg means resting on the floor, and being adapted to be positioned above the one unit with its studs releasably secured in the third pair of sockets and its leg means resting on the cover of the one pan unit.

2. The combination with the food compartment of a refrigerator formed by a bottom, side walls, a back wall, and a front door, a shelf extending across the food compartment, a pair of refrigerator pan units in the food compartment below the shelf, each unit comprising a cover of approximately half the width of the compartment, a pan slidably suspended by and beneath the cover, forward legs depending from the cover at its lateral edges to permit the withdrawal of the pan therebetween, the legs extending down to a horizontal plane beneath the bottom of the pan, the rear of each cover and back wall of the compartment having co-operating releasably engaging elements for rearwardly supporting the cover on the back wall, the height of the pan units being less than half the distance between the shelf and the bottom wall, the wall-carried elements being arranged in both horizontal and vertical alignment, the units being placed side-by-side with their rear ends supported by the horizontally aligned wall-carried elements, a superposed position with their ends supported by the vertically aligned wall-carried elements being an alternative position.

3. The combination with the food compartment of a refrigerator formed by a floor, side walls, a back wall, and a front door,—of a pair of refrigerator pan units in the food compartment, each unit comprising a generally horizontal frame structure of not over half the width of the compartment, a storage pan, the frame structure including a cover for the pan presenting a shelf-like upper surface, and also including a way for slidably suspending the pan beneath the cover, forward leg means depending from the frame structure laterally of the pan to afford clearance for the forward withdrawal of the pan and for forwardly supporting the unit, each frame structure at its rear and the back wall of the compartment carrying co-operating releasably engaging elements for rearwardly supporting the unit on the back wall, the wall-carried elements being arranged in both horizontal and vertical alignments, whereby the units may be mounted side-by-side with their rear ends supported by the horizontally aligned wall-carried elements and their fronts supported by their leg means and may optionally also be positioned in stacked relation with their rear ends supported by the vertically aligned wall-carried elements with the under unit forwardly supported on the floor by its leg means and the upper unit forwardly supported by its leg means upon the frame structure of the upper unit.

4. As one of a pair of like vegetable pan units to be placed in a refrigerator alternatively side by side on the floor or shelf thereof, or in superposed position with one unit on the floor or shelf and the other upon the one unit,—a unit comprising a cover, a pan slidably suspended therefrom and therebeneath, leg means depending from the cover near its front to a position adjoining the bottom of the pan, and elements, which are elements of stud and socket means, on the cover at its rear for cooperating engagement with complementary elements on a vertical wall of the refrigerator, the leg means and the cover-carried elements effecting substantially the sole forward and rearward, respectively, support for the cover, wherein the stud means have resiliently spreading heads adapted to co-operate with restrictive necks in the socket means to retain the stud means in the socket means against forward pull sufficient to overcome the friction of the slidable drawer in the cover, but yielding to greater forward pull to permit removal of the unit.

5. In the combination of a refrigerator food compartment and a pair of separate like pan-and-cover units therein, each of length approximating the depth of the compartment and of width not over half the width of the compartment, and wherein the units are adapted to be placed alternatively side by side upon the floor or shelf of the compartment or in superposed relation with one unit upon the floor or shelf and the other upon the one unit,—the improvement which consists in cooperating elements carried by the units rearwardly thereof and by the back wall of the compartment at such positions thereof as to be engaged by the unit-carried elements when the units are in said alternate positions, whereby releasably to fix the units in such positions.

6. In a removable storage pan unit for refrigerators, a sheet metal cover member, and a pan member adapted to be slidably supported in depending position by said cover member, said cover member having at its rear end, a pair of resilient compressible spring clips adapted to be forced into a suitable socket carried by the wall of a refrigerator, and having, adjacent its forward end, a sheet metal frame member, partially rectangular in shape, comprising a pair of spaced depending sheet metal strip portions secured at their upper ends to said cover member, and joined at their lower ends by a substantially horizontal frame portion, for supporting the unit at its forward end, said frame member serving as a general guide for receiving said pan member, and cooperating sliding guide means carried by said cover member and said pan member for slidably supporting said pan member from said cover member.

7. A removable storage pan unit for refrigerators, according to claim 6, in which the cover member is formed adjacent its forward edge with a pair of socket members, and in which the said horizontal frame portion of said frame member is formed with a pair of spaced, depending, substantially U-shaped foot portions, located to be received in the cover sockets of another similar unit.

8. A removable storage pan unit for refrigerators, according to claim 6, in which the sheet metal frame member is formed with a plurality of longitudinally extending, depending, pressed rib formations.

9. In a refrigerator, the combination of a refrigerator having a food storage compartment provided with floor and side and rear walls, the rear wall of said food storage compartment being provided with a plurality of pairs of spaced socket members, said socket members each having a restriction located adjacent the entrance to the socket member, with a plurality of storage pan units, said units being of a width equal to substantially the half of the width of the food storage compartment, and each including a cover member, a depending pan member slidably mounted below said cover member, and a forward supporting frame member secured to the cover member and surrounding the pan member, and resilient headed compressible securing members projecting rearwardly from said cover members for engagement in said socket members by passing said restrictions, whereby the pan units may be arranged one above the other to leave a high storage space, or one beside the other to utilize the bottom of the food storage compartment.

10. In a removable storage pan unit for refrigerators, a sheet metal cover member, and a pan member adapted to be slidably supported in depending position by said cover member, said cover member having at its rear end a pair of resilient compressible spring clips adapted to be forced into a suitable socket carried by the wall of a refrigerator, and having, adjacent its forward end, a sheet metal frame member, partially rectangular in shape, comprising a pair of spaced depending sheet metal strip portions secured at their upper ends to said cover member, and joined at their lower ends by a substantially horizontal frame portion, for supporting the unit at its forward end, said frame member serving as a general guide for receiving said pan member, and cooperating sliding guide means carried by said cover member and said pan member for slidably supporting said pan member from said cover member, said cover member being formed adjacent its forward edge with a pair of socket members, and the horizontal frame portion of said frame member being formed with a pair of spaced depending substantially U shaped foot portions located to be received in the cover sockets of another similar unit, and said socket members and foot portions being of substantially rectangular shape and substantially complementary to each other.

DON H. GASTON.